US012155647B2

(12) United States Patent
Maruyama

(10) Patent No.: US 12,155,647 B2
(45) Date of Patent: Nov. 26, 2024

(54) INFORMATION PROCESSING APPARATUS AND COMPUTER READABLE MEDIUM

(71) Applicant: FUJIFILM BUSINESS INNOVATION CORP., Tokyo (JP)

(72) Inventor: Yasuhiro Maruyama, Yokohama (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 319 days.

(21) Appl. No.: 17/405,910

(22) Filed: Aug. 18, 2021

(65) Prior Publication Data

US 2022/0303269 A1 Sep. 22, 2022

(30) Foreign Application Priority Data

Mar. 18, 2021 (JP) .................. 2021-044830

(51) Int. Cl.
*H04L 9/40* (2022.01)
(52) U.S. Cl.
CPC ................. *H04L 63/0853* (2013.01)
(58) Field of Classification Search
CPC ............. H04L 63/0853; H04L 63/0815; H04L 63/0876; G06F 21/45
See application file for complete search history.

(56) References Cited

U.S. PATENT DOCUMENTS

2007/0157291 A1 7/2007 Chua
2009/0100060 A1 4/2009 Livnat et al.
(Continued)

FOREIGN PATENT DOCUMENTS

JP 2020-038438 A 3/2020

OTHER PUBLICATIONS

Harini, N., and T. R. Padmanabhan. "2CAuth: a new two factor authentication scheme using QR-code." International Journal of Engineering and Technology 5.2 (2013): 1087-1094. (Year: 2013).*

(Continued)

*Primary Examiner* — Michael R Vaughan
(74) *Attorney, Agent, or Firm* — Oliff PLC

(57) ABSTRACT

An information processing apparatus includes: a storage storing restriction information indicating a restriction that a first communication address of a user registered in an external authentication apparatus is to satisfy in order to be permitted to use the information processing apparatus based on an authentication linkage with the external authentication apparatus; and a processor configured to acquire first information indicating authentication success, the first information being issued by the external authentication apparatus and including a second communication address generated by the external authentication apparatus in association with the first communication address, transmit, to the second communication address included in the first information, second information requesting execution of communication with a predetermined verification device, acquire, from the predetermined verification device, a verification result as to whether the first communication address satisfies the restriction, the first communication address being a transmission source of the communication executed in response to the second information, and, in a case where the verification result indicates that the first communication address does not satisfy the restriction, perform control not to permit an authentication linkage with the external authentication apparatus for the user.

9 Claims, 6 Drawing Sheets

(56) References Cited

U.S. PATENT DOCUMENTS

| | | |
|---|---|---|
| 2014/0075524 A1 | 3/2014 | Ho et al. |
| 2016/0050203 A1* | 2/2016 | Hefetz .................... H04L 51/18 726/7 |
| 2020/0076793 A1 | 3/2020 | Kato |
| 2022/0188400 A1* | 6/2022 | Nassar .................... G06F 21/46 |

OTHER PUBLICATIONS

Feb. 25, 2022 Search Report issued in European Patent Application No. 21195777.4.
Mar. 10, 2022 Office Action issued in European Patent Application No. 21195777.4.
Aug. 27, 2024 Office Action issued in Japanese Patent Application No. 2021-044830.

* cited by examiner

INFORMATION PROCESSING APPARATUS AND COMPUTER READABLE MEDIUM

CROSS-REFERENCE TO RELATED APPLICATIONS

This application is based on and claims priority under 35 USC 119 from Japanese Patent Application No. 2021-044830 filed on Mar. 18, 2021.

BACKGROUND

Technical Field

The present disclosure relates to an information processing apparatus and a computer readable medium storing an information processing program.

Related Art

JP-A-2020-038438 discloses a system that links a user ID of an on-premises environment and a user ID of a portal site that is an external site providing a cloud service and the like. When the portal site receives a user ID linkage request from the on-premises environment, the system requests a user indicated by the user ID for unique information capable of proving that the user is in the on-premises environment, determines authenticity of the unique information input by the user, links the user ID if the unique information is correct, and rejects a linkage of the user ID if the unique information is incorrect.

SUMMARY

In the related art, an information processing apparatus that is allowed to be used by a user after the user is authenticated and an external authentication apparatus that authenticates the user are linked with each other. According to the linkage between the two apparatuses, the user is authenticated by the external authentication apparatus, so that it is not necessary to separately execute authentication processing on the information processing apparatus, and the information processing apparatus can be used. In particular, in this authentication linkage system, the external authentication apparatus may execute the authentication processing using a communication address (a mail address as an example of the communication address) of the user as a user ID for identifying the user.

Here, the information processing apparatus that authenticates and links with the external authentication apparatus may desire to impose a restriction on a communication address that the user has registered for the external authentication apparatus. For example, when a certain organization causes a user belonging to the organization to use the information processing apparatus in an authentication linkage with the external authentication apparatus, the user may desire to limit a user name part of a mail address registered in the external authentication apparatus to a specific format (for example, a user name starts with an employee number).

On the other hand, the external authentication apparatus may generate a communication address instead of the communication address registered in the external authentication apparatus and may notify the information processing apparatus of the generated communication address. In this case, the information processing apparatus cannot verify whether the communication address registered in the external authentication apparatus by the user satisfies the restriction.

Aspects of non-limiting embodiments of the present disclosure relate to enabling an information processing apparatus of an authentication linkage destination to verify a first communication address registered in an external authentication apparatus even when a user notifies the information processing apparatus of a second communication address associated with the first communication address instead of the first communication address.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a storage storing restriction information indicating a restriction that a first communication address of a user registered in an external authentication apparatus is to satisfy in order to be permitted to use the information processing apparatus based on an authentication linkage with the external authentication apparatus; and a processor configured to acquire first information indicating authentication success, the first information being issued by the external authentication apparatus and including a second communication address generated by the external authentication apparatus in association with the first communication address, transmit, to the second communication address included in the first information, second information requesting execution of communication with a predetermined verification device, acquire, from the predetermined verification device, a verification result as to whether the first communication address satisfies the restriction, the first communication address being a transmission source of the communication executed in response to the second information, and, in a case where the verification result indicates that the first communication address does not satisfy the restriction, perform control not to permit an authentication linkage with the external authentication apparatus for the user.

BRIEF DESCRIPTION OF DRAWINGS

Exemplary embodiment(s) of the present invention will be described in detail based on the following figures, wherein.

DETAILED DESCRIPTION

Figure 1:
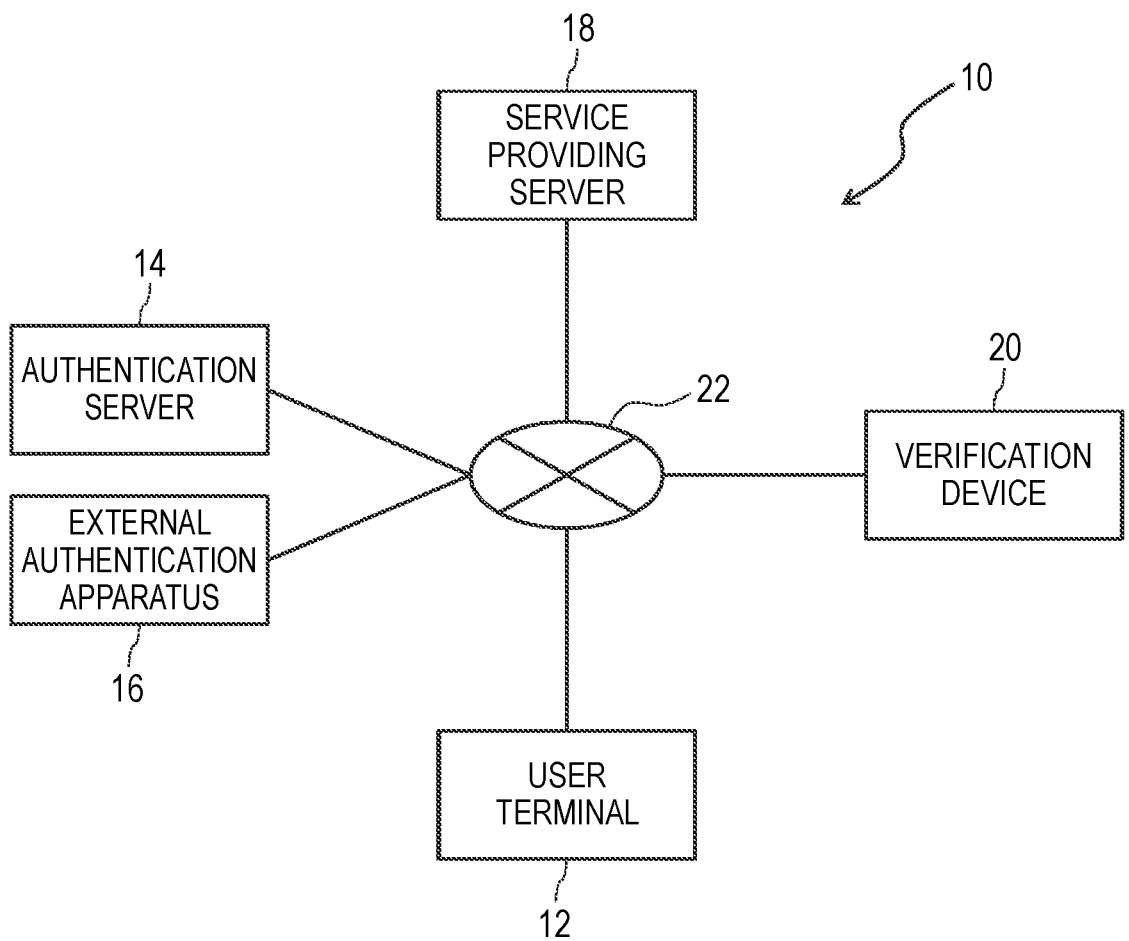
FIG. 1 is a schematic configuration diagram showing an information processing system according to an exemplary embodiment.

FIG. 1 is a schematic configuration diagram showing an information processing system 10 according to an exemplary embodiment. The information processing system 10 includes a user terminal 12 used by a user, an authentication server 14 serving as an information processing apparatus configured to authenticate the user, an external authentication apparatus 16 configured to authenticate the user separately from the authentication server 14, a service providing server 18 configured to provide a service to the user authenticated by the authentication server 14, and a verification device 20. FIG. 1 shows only one user terminal 12. However, the information processing system 10 may include plural user terminals 12 used by plural users. The user terminal 12, the authentication server 14, the external authentication apparatus 16, the service providing server 18, and the verification device 20 are communicably connected to one another via a communication line 22 including, for example, the Internet line and a local area network (LAN).

A flow of processing in the information processing system 10, which is a premise of the present disclosure, is as follows.

First, in order to receive a service provided by the service providing server 18, the user accesses the service providing server 18 from the user terminal 12. The service provided by the service providing server 18 to the user is, for example, a document management service, but is of course not limited thereto. The service providing server 18 requests the authentication server 14 to authenticate the accessing user. In the present exemplary embodiment, the authentication server 14 and the service providing server 18 are separate servers. However, the two servers may be integrated. That is, the authentication server 14 may provide a service.

The authentication server 14 according to the present exemplary embodiment is a server configured to provide an authentication service for authenticating a user who intends to receive one or plural services including a service provided by the service providing server 18 in place of the service. The authentication server 14 stores user information on the user registered in advance, that is, a user ID and authentication information (for example, a password). The authentication server 14 may authenticate the user based on the user information stored in the authentication server 14. However, in the present exemplary embodiment, the authentication server 14 and the external authentication apparatus 16 may be authenticated and linked. The user is authenticated by the external authentication apparatus 16, so that it may be considered that the authentication server 14 has authenticated the user. The external authentication apparatus 16 is, for example, a server provided by Apple Inc., and the authentication linkage service provided by the external authentication apparatus 16 is, for example, "sign in with Apple". However, the external authentication apparatus 16 and the authentication linkage service are not limited thereto.

The external authentication apparatus 16 also stores the user ID and the authentication information of the user that are registered in advance, and the user inputs the user ID and the authentication information to the external authentication apparatus 16 to obtain authentication from the external authentication apparatus 16. Then, information indicating authentication success is transmitted from the external authentication apparatus 16 to the authentication server 14.

In the present exemplary embodiment, a communication address is used as the user ID stored in the authentication server 14 and the external authentication apparatus 16. In the present exemplary embodiment, a mail address is used as the communication address. In the present specification, the mail address serving as the user ID registered by the user in the authentication server 14 is referred to as a "mail address 0", and the mail address serving as the user ID registered by the user in the external authentication apparatus 16 is referred to as a "mail address 1" serving as a first communication address.

It is assumed that the mail address 0 registered by the user in the authentication server 14 and the mail address 1 registered by the user in the external authentication apparatus 16 are different from each other. A case in which the mail address 0 and the mail address 1 are different is not limited thereto. For example, the following case is assumed.

The user is an employee of a certain company, and a user is given a mail address of a company domain from the company. The user executes user registration on the authentication server 14 using the mail address of the company domain as the user ID. That is, the mail address 0 is the mail address of the company domain. The user terminal 12 is provided to the user as a mobile terminal (for example, a smartphone) for business. The mail address used mainly in the user terminal 12 is a mail address of a mobile carrier domain. The user executes user registration on the external authentication apparatus 16 using the mail address of the mobile carrier domain as the user ID. That is, the mail address 1 is the mail address of the mobile carrier domain. In this assumed case, the mail address 0 (the mail address of the company domain) and the mail address 1 (the mail address of the mobile carrier domain) are different from each other.

Here, the user may set the external authentication apparatus 16 such that the external authentication apparatus 16 does not notify the authentication server 14 of the mail address 1. The user executes this setting in advance, so that the external authentication apparatus 16 does not arbitrarily transmit the mail address 1 to another device (the authentication server 14 in the present exemplary embodiment) that is to be authenticated and linked. Therefore, privacy of the mail address 1 is protected. In this case, the external authentication apparatus 16 notifies the authentication server 14 of a mail address different from the mail address 1. The mail address different from the mail address 1 is included in the information indicating the authentication success and is generated by the external authentication apparatus 16. In the present specification, the mail address that is generated by the external authentication apparatus 16 and is notified to the authentication server 14 is referred to as a "mail address 2" serving as a second communication address. The external authentication apparatus 16 stores the mail address 1 and the mail address 2 in association with each other. When the authentication server 14 desires to notify the user, the authentication server 14 sends an e-mail (simply referred to as a "mail" in the present specification) to the mail address 2, and the external authentication apparatus 16 transfers the mail to the mail address 1 (that is, the user).

When the user intends to receive the service provided by the service providing server 18 using the user terminal 12, the user inputs the mail address 1 to the external authentication apparatus 16 and receives the authentication. Then, the external authentication apparatus 16 authenticates the user and transmits the mail address 2 as the user ID of the authenticated user to the authentication server 14. Therefore, it is considered that the authentication server 14 has authenticated the user without knowing the mail address 1 of the user.

Here, the authentication server 14 may desire to verify the mail address 1 of the user. The verification is processing of determining whether the mail address 1 satisfies the predetermined restriction. The restriction may be, for example, that the mail address 1 includes a character string according to a predetermined rule. For example, the restriction is a character string which is "employee number @ predetermined carrier domain". The restriction may be, for example, a mail address of a predetermined domain. Of course, the restriction is not limited thereto.

When the mail address 1 does not satisfy the restriction, the authentication server 14 does not permit the authentication linkage with the external authentication apparatus 16, and it is considered that the authentication server 14 has not authenticated the user. In this way, it is considered that the authentication server 14 authenticates only the user who has been authenticated by the external authentication apparatus 16 with the mail address 1 satisfying the restriction.

If it is considered that the authentication server 14 has authenticated the user, the user is permitted to use the authentication server 14. Here, when the use of the authentication server 14 is permitted, information on that it is considered that the authentication server 14 has authenticated the user is notified to the service providing server 18, so that the user may use a service from the service providing server 18. When the authentication server 14 provides a service to the user, the permission to use the authentication server 14 includes the user being able to use the service from the authentication server 14.

However, as described above, when the external authentication apparatus 16 notifies the authentication server 14 of the mail address 2 instead of the mail address 1, the authentication server 14 cannot verify the mail address 1 since the authentication server 14 cannot know the mail address 1. Therefore, in the present exemplary embodiment, even when the mail address 1 is not notified from the external authentication apparatus 16 to the authentication server 14 by a mechanism described below, it is considered that the authentication server 14 has authenticated only the user authenticated by the external authentication apparatus 16 with the mail address 1 satisfying the restriction.

Figure 2:
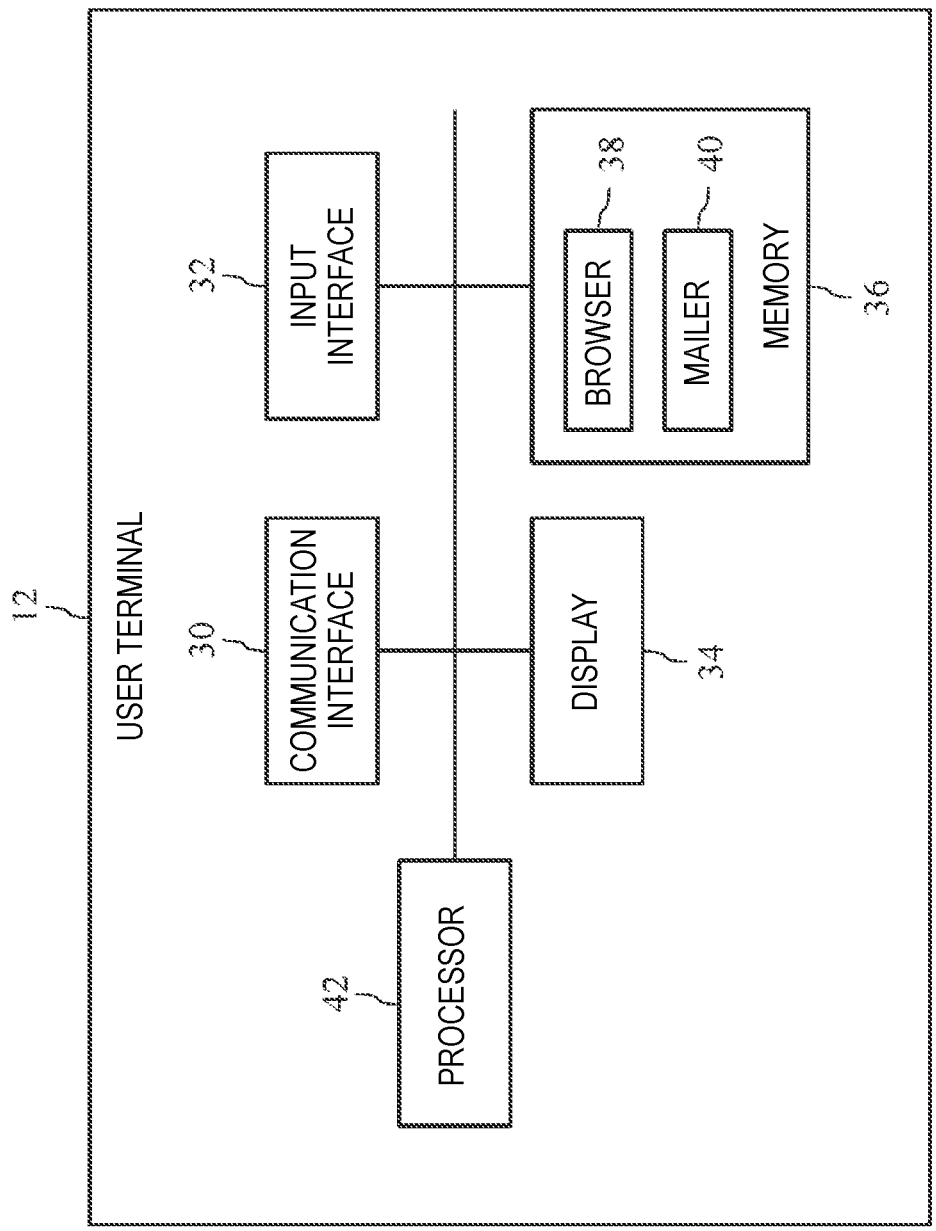
FIG. 2 is a schematic configuration diagram showing a user terminal.

FIG. 2 is a schematic configuration diagram showing the user terminal 12. As described above, the user terminal 12 is assumed to be a mobile terminal such as a smartphone. However, the user terminal 12 is not limited thereto, and may be, for example, a stationary personal computer.

A communication interface 30 includes, for example, a network adapter. The communication interface 30 has a function of communicating with another device via a communication line 22.

An input interface 32 includes, for example, a touch panel, a button, a mouse, or a keyboard. The input interface 32 is used to input a user instruction to the user terminal 12.

A display 34 includes, for example, a liquid crystal panel. Various display screens are displayed on the display 34. In particular, the display 34 displays a login screen provided from the authentication server 14, a login screen provided from the external authentication apparatus 16, a service screen provided from the service providing server 18, or the like. The display 34 displays an execution screen of a browser 38 and a mailer 40, which will be described later.

A memory 36 includes, for example, a hard disk drive (HDD), a solid state drive (SSD), an embedded multi media card (eMMC), a read only memory (ROM), or a random access memory (RAM). The memory 36 stores a program for operating each unit of the user terminal 12. As shown in FIG. 2, the memory 36 stores the browser 38 that is an application for communicating with another device based on hypertext transfer protocol (HTTP) and displaying a content obtained from the other device, and the mailer 40 that is an application for transmitting and receiving a mail. In the present exemplary embodiment, the user accesses the service providing server 18 using the browser 38 and receives a service from the service providing server 18.

In the exemplary embodiments, the term "processor" used as a processor 42 refers to a processor in a broad sense. Examples of the processor 42 include general processors (e.g., CPU: Central Processing Unit), and dedicated processors (e.g., GPU: Graphics Processing Unit, ASIC: Application Specific Integrated Circuit, FPGA: Field Programmable Gate Array, and programmable logic device). The processor 42 is broad enough to encompass one processor or plural processors in collaboration that are located physically apart from one another but may work cooperatively. The order of operations of the processor is not limited to one described in the exemplary embodiments above, and may be changed. The processor 42 is configured to control each unit of the user terminal 12 according to a program stored in the memory 36.

Figure 3:
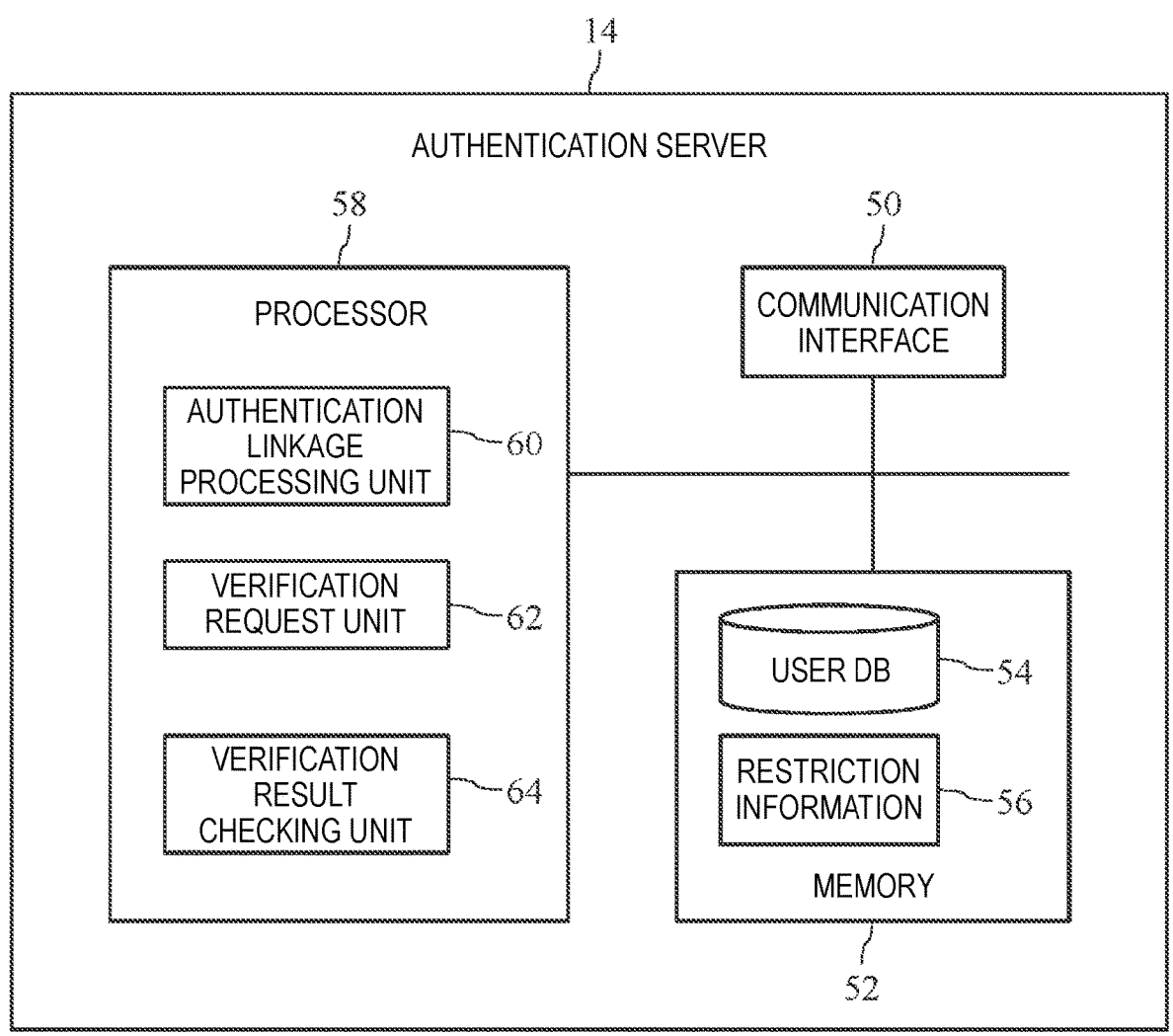
FIG. 3 is a schematic configuration diagram showing an authentication server.

FIG. 3 is a schematic configuration diagram showing the authentication server 14. The authentication server 14 is, for example, a server computer or the like, and may be a computer of any type as long as a function described below may be implemented. The authentication server 14 may include plural computers. That is, the function implemented by the authentication server 14 described below may be implemented by cooperation of the plural computers.

A communication interface 50 includes, for example, a network adapter. The communication interface 50 has a function of communicating with another device via the communication line 22.

A memory 52 serving as a storage device includes, for example, an HDD, an SSD, an eMMC, a ROM, or a RAM. The memory 52 stores an information processing program for causing each unit of the authentication server 14 to function. As shown in FIG. 3, the memory 52 stores a user DB 54 and restriction information 56.

The user DB 54 stores user information on a user who has registered as a user in the authentication service provided by the authentication server 14. Specifically, the user ID and the authentication information (for example, a password) are stored in association with each other. As described above, the user ID stored in the user DB 54 is the mail address 0 of the user. The user may log in directly to the authentication server 14 by inputting the mail address 0 and the authentication information to the authentication server 14.

The restriction information 56 indicates a restriction that the mail address of the user authenticated by the authentication server 14 (that is, the authentication service) needs to satisfy. The restriction is determined in advance by, for example, an administrator of the authentication server 14 or the like. When the mail address serving as the user ID input in the authentication processing does not satisfy the restriction indicated by the restriction information 56, the authentication server 14 does not authenticate the user. In the present exemplary embodiment, as described above, it is considered that the authentication server 14 has authenticated the user since the user has logged in to the external authentication apparatus 16 using the mail address 1. Therefore, it can be said that the restriction information 56 indicates a restriction that the mail address 1 of the user registered in the external authentication apparatus 16 needs to satisfy in order for the use of the authentication server 14 to be permitted based on the authentication linkage with the external authentication apparatus 16.

The same restriction may be uniformly applied to all users. However, different restrictions may be applied depending on the user. For example, different restrictions may be set for each user, or different restrictions may be set for each user group (for example, each company). In this case, the restriction information 56 indicates, to each user, a respective restriction.

A processor 58 refers to a processor in a broad sense. Examples of the processor 58 include at least one of a general-purpose processor (for example, a CPU) and a dedicated processor (for example, a GPU, an ASIC, an FPGA, or a programmable logic device). The processor 58 is broad enough to encompass one processor or plural processors in collaboration that are located physically apart from one another but may work cooperatively. The processor 58 functions as an authentication linkage processing unit 60, a verification request unit 62, and a verification result checking unit 64 according to the information processing program stored in the memory 52.

When receiving a request to authenticate the user, first, the authentication linkage processing unit 60 provides a login screen to the user and displays the login screen on the display 34 (specifically, the browser 38) of the user terminal 12. As described above, in the present exemplary embodiment, the request to authenticate the user is received from the service providing server 18. Specifically, when the user accesses the service providing server 18 from the browser 38, the service providing server 18 requests the authentication server 14 to authenticate the user by redirecting the access from the browser 38 to the authentication server 14. When the authentication server 14 and the service providing server 18 are integrated, the authentication server 14 may receive a request to authenticate the user directly from the user (the browser 38).

When the user requests external authentication by the external authentication apparatus 16 on the login screen displayed on the browser 38, the browser 38 accesses the external authentication apparatus 16. The external authentication apparatus 16 causes the browser 38 to display the login screen for the external authentication apparatus 16, requests the user to input the mail address 1 and the authentication information, and authenticates the user based on the input mail address 1 and the authentication information. When the external authentication apparatus 16 succeeds in authentication of the user, the external authentication apparatus 16 issues first information indicating authentication success and transmits the first information to the authentication server 14. For example, in response to the authentication success by the external authentication apparatus 16, the external authentication apparatus 16 transmits, to the authentication server 14 via the browser 38, a parameter for redirecting the browser 38 to the authentication server 14. When the external authentication apparatus 16 fails in the authentication of the user, the external authentication apparatus 16 transmits information indicating authentication failure to the authentication server 14. Based on the information, the authentication linkage processing unit 60 does not consider that the user has been authenticated.

The first information transmitted from the external authentication apparatus 16 to the authentication server 14 includes the mail address 2 generated corresponding to the mail address 1 by the external authentication apparatus 16 and an authentication code that is a token having a short survival period (a valid period). In this way, the authentication linkage processing unit 60 acquires the first information that indicates the authentication success, that is issued by the external authentication apparatus 16, and that includes the mail address 2 generated by the external authentication apparatus 16 in association with the mail address 1.

When receiving the first information from the external authentication apparatus 16, the authentication linkage processing unit 60 transmits, to the external authentication apparatus 16, a token request including the authentication code included in the first information and the mail address 2 serving as the user ID. The external authentication apparatus 16 verifies the received token request. For example, the external authentication apparatus 16 verifies whether the authentication code is valid and whether the user indicated by the mail address 2 has been recently authenticated. If the token request is valid, checking information indicating that it has been checked that the token request is valid is transmitted to the authentication server 14. Based on the checking information from the external authentication apparatus 16, the authentication linkage processing unit 60 grasps that the user has been authenticated by the external authentication apparatus 16.

Based on the first information, the authentication linkage processing unit 60 may grasp that the user indicated by the mail address 2 has been authenticated by the external authentication apparatus 16, but cannot grasp which user registered in the user DB 54 the user indicated by the mail address 2 is. Therefore, the authentication linkage processing unit 60 requests the user who has initially provided the login screen for identification information capable of identifying the user. In the present exemplary embodiment, the authentication linkage processing unit 60 requests the user for the mail address 0 that is the user ID in the authentication server 14. The authentication linkage processing unit 60 stores the mail address 0 serving as the identification information received from the user in association with the mail address 2 included in the first information.

The verification request unit 62 is configured to request the verification device 20 (described in detail later) to verify whether the mail address 1 used by the user for authentication by the external authentication apparatus 16 satisfies the restriction indicated by the restriction information 56. Specifically, the verification request unit 62 transmits, to the mail address 2 (that is, the external authentication apparatus 16) included in the first information received from the external authentication apparatus 16, second information for requesting execution of communication with the verification device 20. The second information may be a mail, and includes, in a body thereof, a mail address of the verification device 20 and a text for requesting transmission of a mail having the mail address 1 as a transmission source to the mail address of the verification device 20. The second information may include a text for notifying that the mail address 1 is known to the verification device 20 when a mail is transmitted to the verification device 20.

The external authentication apparatus 16 that has received the second information specifies the mail address 1 corresponding to the mail address 2, and transfers the second information to the specified mail address 1 (that is, the user terminal 12). The user who has received the second information checks a content of the mail serving as the second information using the mailer 40 of the user terminal 12, and sends the mail having the mail address 1 as the transmission source to the verification device 20 using the mailer 40. As will be described in detail later, the verification device 20 acquires the mail address 1 from the transmission source of the mail from the user terminal 12, and verifies, based on the restriction information 56 acquired from the authentication server 14, whether the mail address 1 satisfies the restriction indicated by the restriction information 56. Then, the verification device 20 transmits information indicating a verification result to the authentication server 14.

Here, when the mail is transmitted to the verification device 20 as the second information, if the text for notifying that the mail address 1 is known to the verification device 20 is included, the user may transmit the mail to the verification device 20 after being convinced that the mail address 1 is to be known to the verification device 20. If the user does not desire the verification device 20 to know the mail address 1, the user may choose not to transmit the mail to the verification device 20. In this case, since the authentication linkage between the authentication server 14 and the external authentication apparatus 16 is not executed, the user needs to be authenticated by the authentication server 14 based on another method in order to receive the service provided by the service providing server 18.

The verification request unit 62 may generate secret information and include the generated secret information in the second information to be transmitted to the external authentication apparatus 16. In this case, the verification request unit 62 holds correspondence between the generated secret information and the corresponding mail address 2. The secret information is used by the verification device 20 to check that the mail transmitted from the user terminal 12 is certainly based on the verification request from the authentication server 14. When the second information includes the secret information, the second information includes information for requesting transmission of the mail including the secret information to the verification device 20.

A minimum requirement of the secret information is that the secret information be unique information. For example, automatically generated random data may be used as the secret information. The verification device 20 (specifically, a verification unit 76 (described in detail later)) that has received the second information including the secret information sends the secret information to the authentication server 14. The verification request unit 62 checks whether the secret information received from the verification device 20 is recently generated, and transmits a checking result to the verification device 20. If the second information received by the verification device 20 is not valid, the secret information received by the verification requesting unit 62 from the verification device 20 has not been recently generated by the verification requesting unit 62. Therefore, the verification device 20 may determine that the second information is not valid based on the checking result transmitted from the verification request unit 62. When the second information is not valid, the verification device 20 may prevent the verification processing from being executed. Based on the secret information received from the verification device 20, the verification request unit 62 may grasp that the user has transmitted the mail to the verification device 20 for the mail address 2 corresponding to the secret information.

The secret information may include information indicating a date and time of the linkage processing when the authentication linkage processing between the authentication server 14 and the external authentication apparatus 16 has been executed. For example, the date and time of the linkage processing may be a time at which the first information is acquired from the external authentication apparatus 16, or may be a time at which the verification request unit 62 transmits the second information to the external authentication apparatus 16. By including the date and time of the linkage processing in the secret information, the verification device 20 does not need to transmit the secret information to the authentication server 14, and may check whether the secret information is recently generated. When the date and time of the linkage processing indicates a time before a predetermined time from the present time, the verification device 20 may prevent the verification processing from being executed.

The secret information may include identification information for identifying the user, for example, the mail address 0 of the user. In this case, the verification device 20 transmits the mail address 0 together with the verification result to the authentication server 14. Accordingly, the verification request unit 62 does not need to hold the correspondence between the secret information and the corresponding mail address 2 (or the mail address 0), and may grasp that for which user the verification device 20 has verified the mail address 1.

The secret information may include the restriction information 56. By including the restriction information 56 in the secret information, the verification device 20 may acquire the restriction information 56 without requesting the authentication server 14 for the restriction information 56 when verifying the mail address 1 of the user. When different restrictions are applied depending on the user and the mail address 0 is received from the user, the verification request unit 62 may specify the restriction to be applied to the user based on the received mail address 0, and may include the restriction information 56 indicating the specified restriction in the secret information. Accordingly, the verification device 20 may verify whether the mail address 1 of the user satisfies the restriction corresponding to the user.

Further, the secret information may include signature information for preventing falsification.

The verification result checking unit 64 acquires, from the verification device 20, a verification result of whether the mail address 1 of the user satisfies the restriction information 56. When the verification result indicates that the mail address 1 satisfies the restriction information 56, the verification result checking unit 64 executes control to permit the authentication linkage between the authentication server 14 and the external authentication apparatus 16. That is, it is considered that the authentication server 14 has authenticated the user, and the verification result checking unit 64 notifies the service providing server 18 that the user has been authenticated. Accordingly, the service is provided to the user from the service providing server 18.

When the verification result indicates that the mail address 1 satisfies the restriction information 56, the verification result checking unit 64 registers, in the memory 52, information indicating that the mail address 0 of the user and the mail address 2 notified from the external authentication apparatus 16 correspond to each other. Accordingly, even when the user is authenticated by the external authentication, the authentication server 14 may identify the user based on the mail address 2 without needing to inquire the user for the mail address 0 one by one. For example, the authentication server 14 may give an authority suitable for the user to the user based on the mail address 2.

On the other hand, when the verification result indicates that the mail address 1 does not satisfy the restriction information 56, the verification result checking unit 64 executes control not to permit the authentication linkage between the authentication server 14 and the external authentication apparatus 16. That is, even if the user is authenticated by the external authentication apparatus 16, the authentication server 14 does not consider that the user has been authenticated. In this case, since the authentication linkage between the authentication server 14 and the external authentication apparatus 16 is not executed, the user needs to be authenticated by the authentication server 14 based on another method in order to receive the service provided by the service providing server 18.

Figure 4:
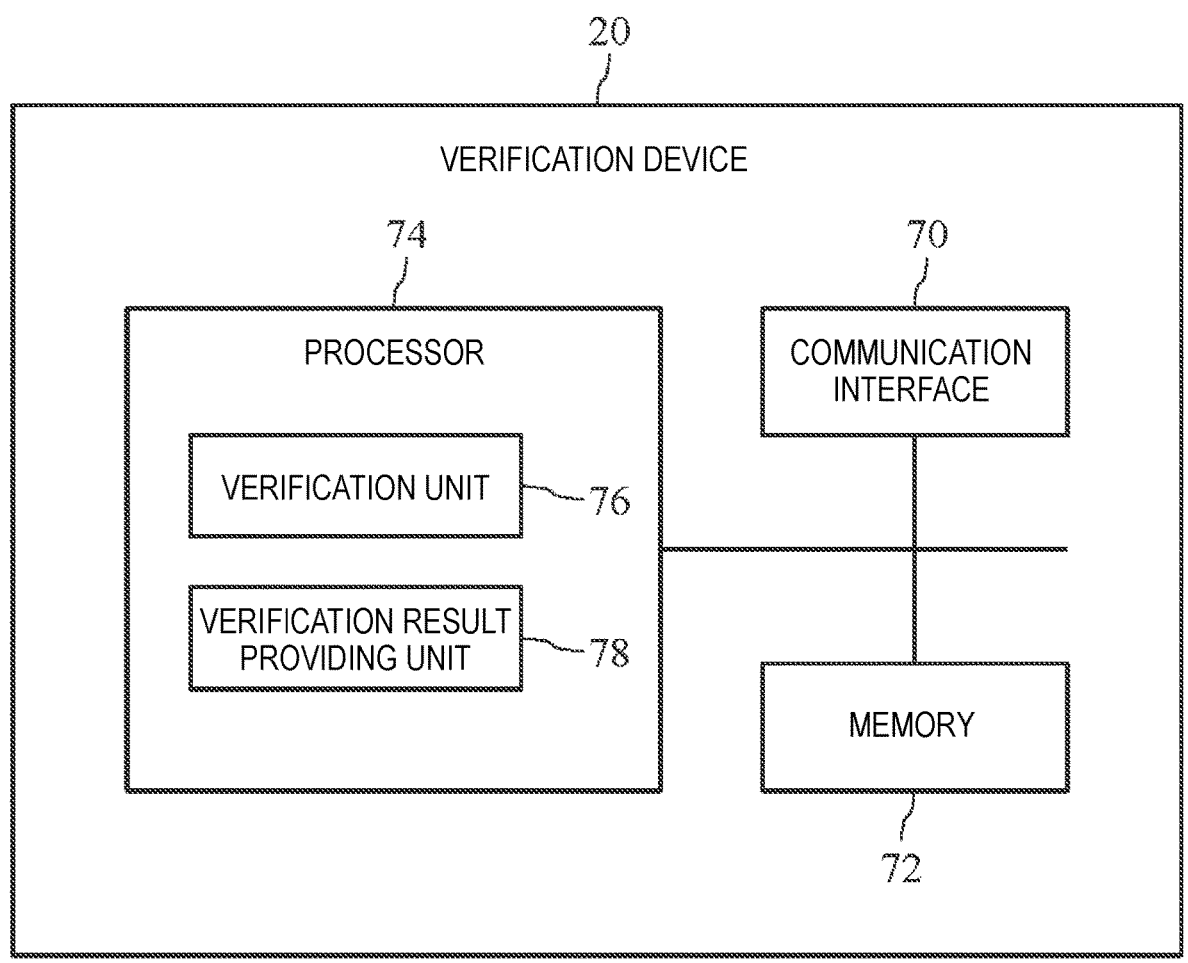
FIG. 4 is a schematic configuration diagram showing a verification device.

FIG. 4 is a schematic configuration diagram showing the verification device 20. The verification device 20 is, for example, a server computer or the like, and may be a computer of any type as long as a function described below may be implemented. In the present exemplary embodiment, the verification device 20 is separate from the authentication server 14. However, the verification device 20 may be integrated with the authentication server 14. When the verification device 20 and the authentication server 14 are separate, the verification device 20 may operate a third-party organization that is independent of the authentication server 14. As described above, the verification device 20 acquires the mail address 1 for which the user prohibits the external authentication apparatus 16 from notifying the authentication server 14. Therefore, it is desirable that a third party organization that operates the verification device 20 be an organization trusted by the user. For example, the third party organization may be a public organization.

A communication interface 70 includes, for example, a network adapter. The communication interface 70 has a function of communicating with another device via the communication line 22.

A memory 72 includes, for example, an HDD, an SSD, an eMMC, a ROM, a RAM, or the like. The memory 72 stores a program for causing each unit of the verification device 20 to function.

A processor 74 refers to a processor in a broad sense. Examples of the processor 74 include at least one of a general-purpose processor (for example, a CPU) and a dedicated processor (for example, a GPU, an ASIC, an FPGA, or a programmable logic device). The processor 74 is broad enough to encompass one processor or plural processors in collaboration that are located physically apart from one another but may work cooperatively. The processor 74 functions as the verification unit 76 and a verification result providing unit 78 according to the program stored in the memory 72.

The verification unit 76 acquires the mail address 1 of the user from a transmission source address of the mail transmitted from the user who has received the second information. The verification unit 76 receives the restriction information 56 from the authentication server 14. As described above, the verification unit 76 may acquire the restriction information 56 by accessing the authentication server 14, or may acquire the restriction information 56 included in the second information. Then, the verification unit 76 verifies whether the mail address 1 satisfies the restriction indicated by the restriction information 56.

The verification unit 76 also checks the secret information included in the mail received from the user. Since the checking of the secret information is as described above, the repeated description will be omitted here.

The verification unit 76 may refer to transfer path information indicating a transfer path of the mail received from the user, and may determine validity of the mail address 1 based on the transfer path of the mail. The transfer path information is included in attribute information (a property) of the mail. For example, when the mail is transmitted to the verification device 20 via servers of plural countries, the verification unit 76 may determine that the mail address 1 is not valid.

The verification result providing unit 78 provides the verification result of the mail address 1 of the verification unit 76 to the authentication server 14. When the verification unit 76 determines the validity of the mail address 1 based on the transfer path of the mail, the verification result providing unit 78 also provides the determination result to the authentication server 14. When the verification result checking unit 64 of the authentication server 14 has received the determination result from the verification result providing unit 78, if the determination result indicates that the mail address 1 is not valid, the verification result checking unit 64 does not permit the authentication linkage with the external authentication apparatus 16 for the user, and does not consider that the user has been authenticated.

An outline of the configuration of the information processing system 10 according to the present exemplary embodiment is as described above. As described above, in the information processing system 10, when authenticating the user, the external authentication apparatus 16 transmits, to the authentication server 14, the first information that indicates the authentication success and that includes the mail address 2 of the user. The verification request unit 62 of the authentication server 14 transmits, to the mail address 2 (that is, the external authentication apparatus 16), the second information for requesting the execution of communication with the verification device 20. The external authentication apparatus 16 transfers the second information to the mail address 1 (that is, the user). In response to the second information, the user sends a mail whose transmission source is the mail address 1 to the verification device 20. Accordingly, the verification device 20 acquires the mail address 1. The verification device 20 verifies whether the mail address 1 satisfies the restriction indicated by the restriction information 56, and sends the verification result to the authentication server 14. By executing this processing, even if the notification of the mail address 1 from the external authentication apparatus 16 to the authentication server 14 is prohibited, the authentication server 14 may check whether the mail address 1 of the user satisfies the restriction.

Hereinafter, a flow of the processing of the information processing system 10 will be described with reference to flowcharts shown in FIGS. 5 and 6.

Figure 5:
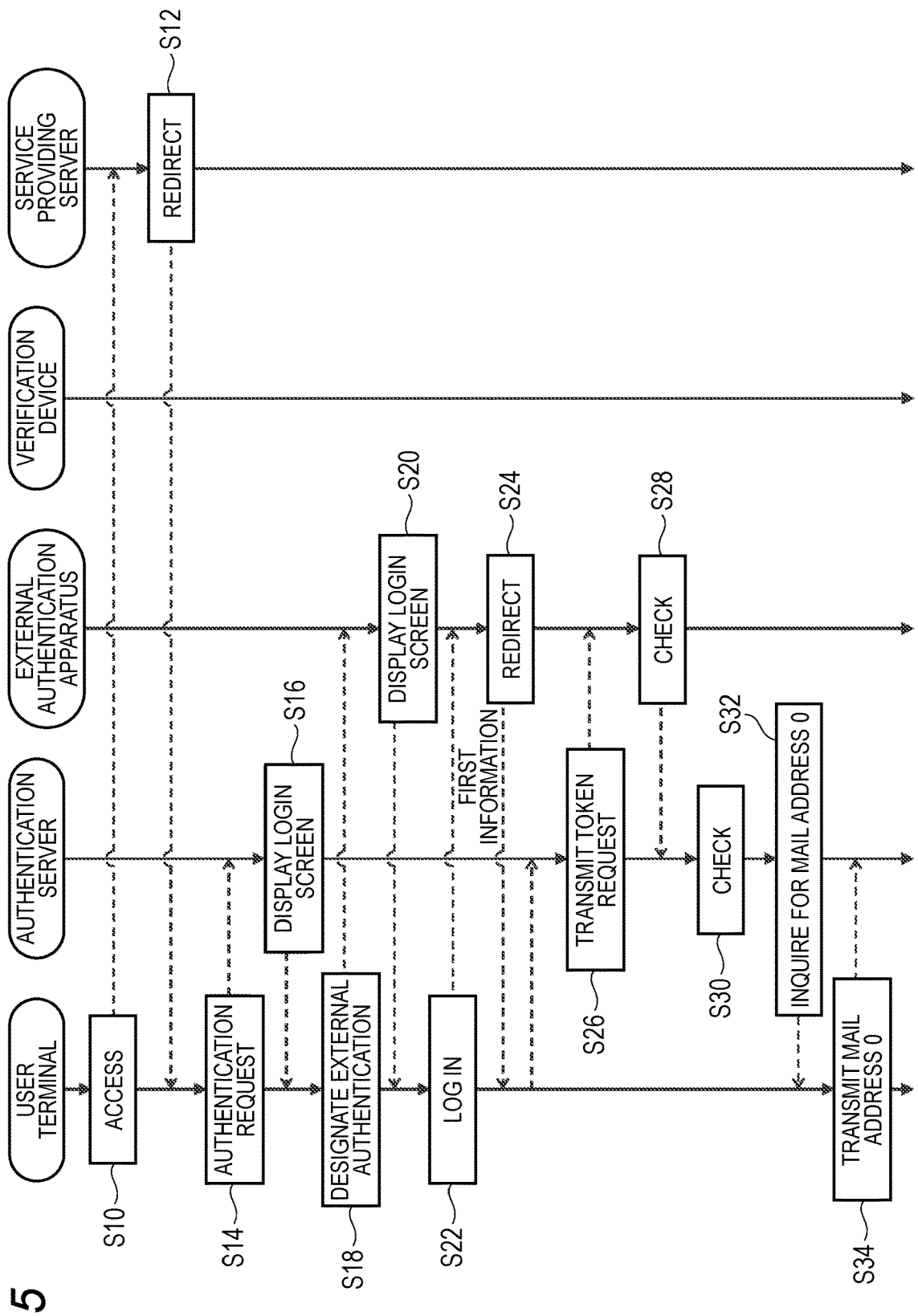
FIG. 5 is a first flowchart showing a flow of processing of the information processing system according to the present exemplary embodiment.

In step S10 in FIG. 5, the user accesses the service providing server 18 from the browser 38 of the user terminal 12 in order to use the service provided by the service providing server 18.

In step S12, the service providing server 18 redirects the access from the user to the authentication server 14 in order to request the authentication server 14 to authenticate the user.

In step S14, the redirected browser 38 accesses the authentication server 14 to issue an authentication request.

In step S16, the authentication linkage processing unit 60 of the authentication server 14 that has received the authentication request from the browser 38 causes the browser 38 to display the login screen to the authentication server 14. On the login screen, the user is allowed to select the external authentication.

In step S18, the user designates the external authentication on the login screen displayed in step S16. Accordingly, the browser 38 accesses the external authentication apparatus 16.

In step S20, the external authentication apparatus 16 causes the browser 38 to display the login screen to the external authentication apparatus 16.

In step S22, the user inputs the user ID, that is, the mail address 1 already registered in the external authentication apparatus 16, and the authentication information on the login screen displayed in step S20, and logs in to the external authentication apparatus 16.

In step S24, the external authentication apparatus 16 authenticates the user based on the mail address 1 and the authentication information that are input in step S22. Here, it is assumed that the authentication is successful. When the authentication is successful, the external authentication apparatus 16 redirects the browser 38 to the authentication server 14. As a parameter at that time, the external authentication apparatus 16 transmits, to the authentication server 14 via the browser 38, the first information that indicates the authentication success and that includes the mail address 2 corresponding to the input mail address 1 and the authentication code.

In step S26, the authentication linkage processing unit 60 of the authentication server 14 transmits, to the external authentication apparatus 16, a token request including the authentication code and the mail address 2 that are acquired in step S24.

In step S28, the external authentication apparatus 16 verifies the token request received in step S26. Here, it is assumed that the token request is valid, and the external authentication apparatus 16 transmits, to the authentication server 14, the checking information indicating that it has been checked that the token request is valid.

In step S30, the authentication linkage processing unit 60 of the authentication server 14 checks that the user has been authenticated by the external authentication apparatus 16.

In step S32, the authentication linkage processing unit 60 of the authentication server 14 inquires of the user who has received the authentication request in step S14 for the mail address 0 that is the user ID in the authentication server 14.

In step S34, the user transmits the mail address 0 to the authentication server 14 in response to the inquiry from the authentication server 14 in step S32. The authentication linkage processing unit 60 stores the mail address 2 acquired in step S24 in association with the mail address 0 acquired in step S34.

Figure 6:
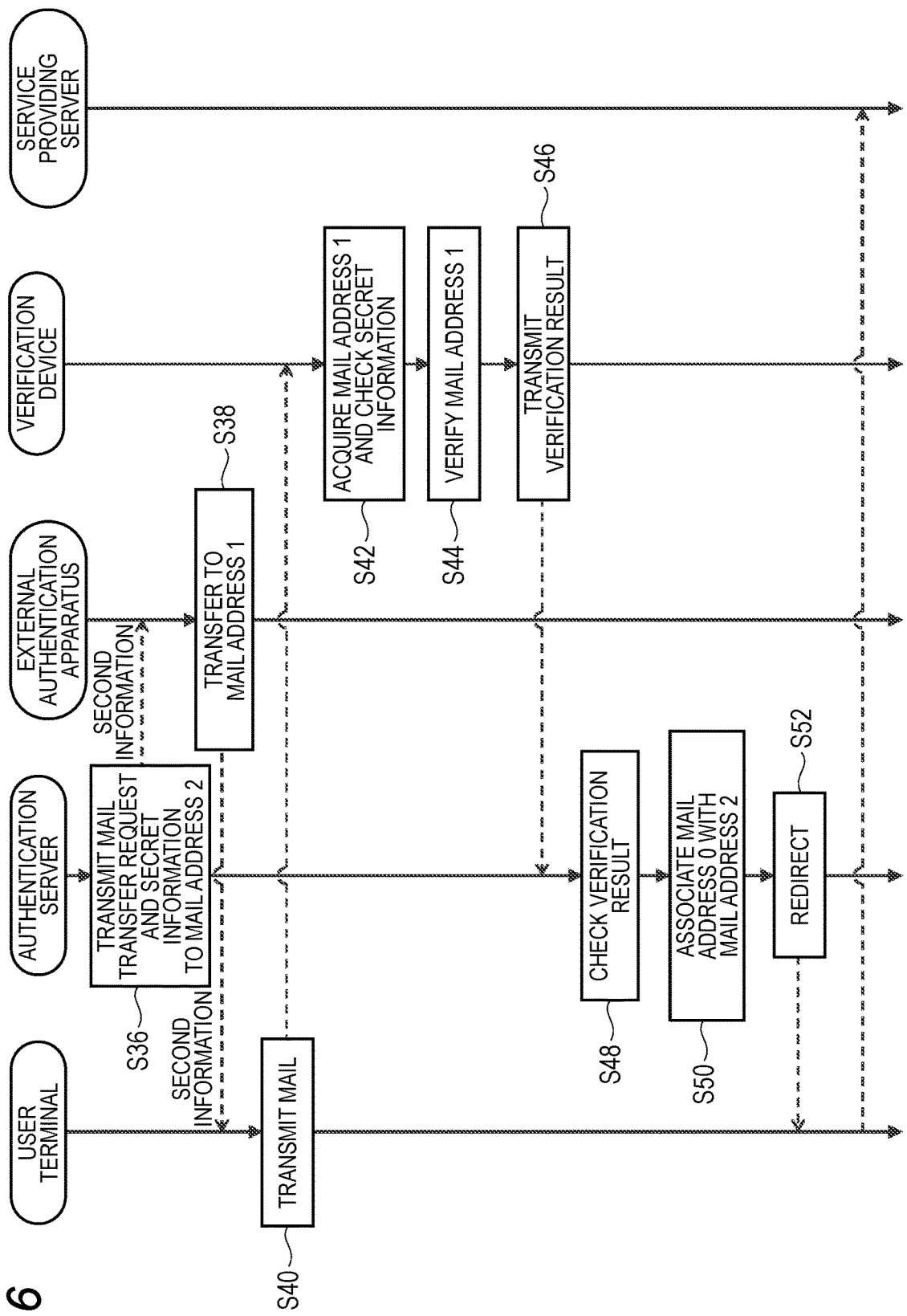
FIG. 6 is a second flowchart showing a flow of processing of the information processing system according to the present exemplary embodiment.

In step S36 in FIG. 6, the verification request unit 62 of the authentication server 14 transmits, to the mail address 2 (that is, the external authentication apparatus 16), the second information for requesting the execution of communication with the verification device 20. The second information includes the mail address of the verification device 20 and the above-described secret information.

In step S38, the external authentication apparatus 16 transfers the second information to the mail address 1 (that is, the user terminal 12) corresponding to the mail address 2 received in step S36.

In step S40, in response to the second information received in step S38, the user transmits the mail including the secret information to the mail address of the verification device 20 using the mailer 40 with the mail address of the transmission source as the mail address 1.

In step S42, the verification unit 76 of the verification device 20 acquires the mail address 1 from the transmission source address of the mail received in step S40. Further, as described above, the verification unit 76 checks the secret information included in the mail.

In step S44, the verification unit 76 verifies whether the mail address 1 acquired in step S40 satisfies the restriction indicated by the restriction information 56. As described above, the verification device 20 may acquire the restriction information 56 by accessing the authentication server 14, or the restriction information 56 may be included in the secret information. The verification unit 76 refers to transfer path information indicating a transfer path of the mail received in step S40, and determines the validity of the mail address 1 based on the transfer path of the mail. The transfer path information is included in the attribute information of the mail.

In step S46, the verification result providing unit 78 of the verification device 20 transmits, to the authentication server 14, the verification result of the mail address 1 in step S44 and a determination result of the validity of the mail address 1.

In step S48, the verification result checking unit 64 of the authentication server 14 checks the verification result of the mail address 1 and the determination result of the validity of the mail address 1 that are received in step S46. Here, it is assumed that the verification result of the mail address 1 indicates that the mail address 1 satisfies the restriction indicated by the restriction information 56, and the determination result of the validity of the mail address 1 indicates that the mail address 1 is valid. Therefore, the verification result checking unit 64 permits the authentication linkage between the authentication server 14 and the external authentication apparatus 16, and it is considered that the authentication server 14 has authenticated the user.

In step S50, the verification result checking unit 64 stores the mail address 0 and the mail address 2 in association with each other in the memory 52. The mail address 0 and the mail address 2 are held by the authentication linkage processing unit 60 in step S34.

In step S52, the authentication linkage processing unit 60 of the authentication server 14 redirects the browser 38 to the service providing server 18. Along with the redirect, the authentication linkage processing unit 60 transmits, to the service providing server 18, information indicating that the user has been authenticated for the service providing server 18. Accordingly, the service is provided to the user from the service providing server 18.

In step S48, if the verification result of the mail address 1 indicates that the mail address 1 does not satisfy the restriction indicated by the restriction information 56 or the determination result of the validity of the mail address 1 indicates that the mail address 1 is not valid, the verification result checking unit 64 does not permit the authentication linkage between the authentication server 14 and the external authentication apparatus 16, it is considered that the authentication server 14 has not authenticated the user, and the processing ends without executing the processing in step S50 and step S52.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
 a memory storing restriction information indicating a restriction that a first mail address of a user registered in an external authentication apparatus is to satisfy in order to be permitted to use the information processing apparatus based on an authentication linkage with the external authentication apparatus; and a processor in communication with the memory and configured to:
  acquire first information indicating authentication success, the first information being issued by the external authentication apparatus and including a second mail address generated by the external authentication apparatus in association with the first mail address, the second mail address being different from the first mail address,
  transmit, to the second mail address included in the first information, second information requesting execution of communication with a predetermined verification device,
  acquire, from the predetermined verification device, a verification result as to whether the first mail address satisfies the restriction, the first mail address being a transmission source of the communication executed in response to the second information, the external authentication apparatus not notifying the first mail address to the information processing apparatus, and,
  in a case where the verification result indicates that the first mail address does not satisfy the restriction, perform control not to permit an authentication linkage with the external authentication apparatus for the user.

2. The information processing apparatus according to claim 1, wherein
  the processor is configured to receive, from the predetermined verification device, a determination result of validity of the first mail address based on a transfer path of the communication from the user is further received, and when the determination result indicates that the first mail address is not valid, an authentication linkage with the external authentication apparatus for the user is not permitted.

3. The information processing apparatus according to claim 2, wherein
  the processor is configured to provide at least a part of the restriction information to the verification device, and the verification device determines whether the first mail address satisfies the restriction indicated by the restriction information provided from the processor, and provides a determination result to the processor.

4. The information processing apparatus according to claim 3, wherein
  the processor is configured to:
    receive, after acquiring the first information, an input of identification information of the user in the information processing apparatus from the user, and
    provide, to the verification device, the restriction information indicating the restriction to be applied to the user, the restriction information being specified according to the received identification information.

5. The information processing apparatus according to claim 2, wherein
  the processor is configured to:
    receive an input of identification information of the user in the information processing apparatus from the user after acquiring the first information, and,
    in a case where the verification result indicates that the first mail address satisfies the restriction, permit an authentication linkage for the user with the external authentication apparatus and register information indicating that the second mail address and the identification information correspond to each other.

6. The information processing apparatus according to claim 1, wherein
  the processor is configured to provide at least a part of the restriction information to the verification device, and the verification device determines whether the first mail address satisfies the restriction indicated by the restriction information provided from the processor, and provides a determination result to the processor.

7. The information processing apparatus according to claim 6, wherein
  the processor is configured to:
    receive, after acquiring the first information, an input of identification information of the user in the information processing apparatus from the user, and
    provide, to the verification device, the restriction information indicating the restriction to be applied to the user, the restriction information being specified according to the received identification information.

8. The information processing apparatus according to claim 1, wherein
  the processor is configured to:
    receive an input of identification information of the user in the information processing apparatus from the user after acquiring the first information, and,
    in a case where the verification result indicates that the first mail address satisfies the restriction, permit an authentication linkage with the external authentication apparatus for the user and register information indicating that the second mail address and the identification information correspond to each other.

9. A non-transitory computer readable medium storing an information processing program causing a computer to execute a process for information processing, the computer including a memory storing restriction information indicating a restriction that a first mail address of a user registered in an external authentication apparatus is to satisfy in order to be permitted to use an information processing apparatus based on an authentication linkage with the external authentication apparatus, the process comprising:
  acquiring first information indicating authentication success, the first information being issued by the external authentication apparatus and including a second mail address generated by the external authentication apparatus in association with the first mail address, the second mail address being different from the first mail address,
  transmitting, to the second mail address included in the first information, second information requesting execution of communication with a predetermined verification device,
  acquiring, from the predetermined verification device, a verification result as to whether the first mail address satisfies the restriction, the first mail address being a transmission source of the communication executed in response to the second information, the external authentication apparatus not notifying the first mail address to the information processing apparatus, and,
  in a case where the verification result indicates that the first mail address does not satisfy the restriction, performing control not to permit an authentication linkage with the external authentication apparatus for the user.

* * * * *